US 8,440,123 B2

(12) United States Patent
Hanson et al.

(10) Patent No.: US 8,440,123 B2
(45) Date of Patent: May 14, 2013

(54) UNITIZED COMPOSITES UTILIZING MELTED SYNTHETIC FIBERS TO ACHIEVE ROUGH OR ABRASIVE ATTRIBUTES AND DECORATIVE EFFECTS

(75) Inventors: James P. Hanson, Lawton, MI (US); Larry L. Pio, Portage, MI (US)

(73) Assignee: Marketing Technology Services, Inc., Kalamazoo, MI (US)

( * ) Notice: Subject to any disclaimer, the term of this patent is extended or adjusted under 35 U.S.C. 154(b) by 370 days.

(21) Appl. No.: 12/719,180

(22) Filed: Mar. 8, 2010

(65) Prior Publication Data

US 2011/0214827 A1  Sep. 8, 2011

Related U.S. Application Data

(63) Continuation of application No. 11/955,191, filed on Dec. 12, 2007, now abandoned.

(60) Provisional application No. 60/981,268, filed on Oct. 12, 2007.

(51) Int. Cl.
*B32B 27/04* (2006.01)

(52) U.S. Cl.
USPC ... 264/172.15; 264/324; 264/248; 264/171.1; 264/171.17; 264/171.18; 264/517; 264/518

(58) Field of Classification Search .......... 264/517, 264/518, 324, 248, 171.1, 171.17, 171.18, 264/172.15
See application file for complete search history.

(56) References Cited

U.S. PATENT DOCUMENTS

| | | | |
|---|---|---|---|
| 2,409,066 A | 10/1946 | Powell et al. | |
| 2,500,690 A | 3/1950 | Lannan | |
| 2,862,542 A | 12/1958 | Norton | |
| 3,012,923 A | 12/1961 | Slayter | |
| 3,180,775 A | 4/1965 | Sexsmith | |
| 3,214,323 A | 10/1965 | Russell et al. | |
| 3,616,031 A | 10/1971 | Fleissner | |
| 3,949,128 A | 4/1976 | Ostermeier | |
| 4,111,733 A | 9/1978 | Periers | |
| 4,289,513 A | 9/1981 | Brownhill et al. | |
| 5,491,016 A | 2/1996 | Kaiser et al. | |
| 5,558,924 A | 9/1996 | Chien et al. | |
| 5,620,541 A * | 4/1997 | Herzberg ............... 156/62.2 |

(Continued)

FOREIGN PATENT DOCUMENTS

GB  2145126 A  3/1985
JP  2004169235 A  6/2004

OTHER PUBLICATIONS

Invitation to Pay Additional Fees and, Where Applicable, Protest Fee, from application No. PCT/US07/71236, having a mailing date of Aug. 4, 2008, 2 pages.

(Continued)

*Primary Examiner* — Timothy Kennedy
(74) *Attorney, Agent, or Firm* — Butzel Long

(57) ABSTRACT

A manufacturing process for making short fiber low denier unitized composite fabrics with abrasive features includes steps of depositing an assembly comprising one or more layers of fibrous material and optionally one or more layers of non-fibrous material, at least one of the outer layers containing a multicompartment synthetic fiber, and activating at least one component of the multicomponent fiber to impart an abrasive attribute to the outer surface.

8 Claims, 7 Drawing Sheets

U.S. PATENT DOCUMENTS

| | | | |
|---|---|---|---|
| 6,090,469 A | 7/2000 | Wadsworth et al. | |
| 6,267,252 B1* | 7/2001 | Amsler | 210/490 |
| 6,635,136 B2 | 10/2003 | White et al. | |
| 6,867,156 B1 | 3/2005 | White et al. | |
| 6,998,164 B2 | 2/2006 | Neely et al. | |
| 7,045,029 B2 | 5/2006 | DeLucia et al. | |
| 2001/0009711 A1 | 7/2001 | Latimer et al. | |
| 2001/0054777 A1* | 12/2001 | White et al. | 264/103 |
| 2003/0022584 A1 | 1/2003 | Latimer et al. | |
| 2003/0077970 A1 | 4/2003 | DeLucia et al. | |
| 2003/0203695 A1 | 10/2003 | Polanco et al. | |
| 2003/0213109 A1 | 11/2003 | Neely et al. | |
| 2005/0130536 A1* | 6/2005 | Siebers et al. | 442/327 |
| 2006/0027944 A1* | 2/2006 | Bentley et al. | 264/171.1 |
| 2006/0042049 A1 | 3/2006 | Petersen | |

OTHER PUBLICATIONS

International Search Report, from application No. PCT/US07/71230, having a mailing date of Jun. 25, 2008, 2 pages.

* cited by examiner 051111J (Top)

051111J (Bottom)

050728B

051202A

MTS Sample 9 - 060612J (2X)

UNITIZED COMPOSITES UTILIZING MELTED SYNTHETIC FIBERS TO ACHIEVE ROUGH OR ABRASIVE ATTRIBUTES AND DECORATIVE EFFECTS

CROSS-REFERENCE TO RELATED APPLICATIONS

This application claims priority as a continuation under 35 U.S.C. §120 to U.S. Nonprovisional application Ser. No. 11/955,191 filed on Dec. 12, 2007 (now abandoned). U.S. Nonprovisional application Ser. No. 11/955,191 claimed priority under 35 U.S.C. §119(e) to U.S. Provisional application 60/981,268 filed on Oct. 12, 2007; the entire disclosures of which are incorporated herein by reference.

FIELD OF THE INVENTION

The present invention relates to manufacture of unitized composites utilizing melted synthetic fibers to achieve controlled rough, abrasive attributes, or to achieve decorative patterning effects and the finished product applications for fabrics so produced.

BACKGROUND OF THE INVENTION

Abrasive scrubbing pads are commonly used for many cleaning and personal care practices. In general, scrubbing pads include a naturally occurring or manufactured abrasive material. Examples of typical abrasive materials commonly used in the past include pumice, loofah, steel wool, and a wide variety of plastic materials. A non-absorbent abrasive material is often combined with an absorbent sponge-like backing material in these products. For example, the abrasive material often forms a layer on a multi-layer product which also includes an absorbent layer of natural sponge, regenerated cellulose, or some other type of absorbent foamed product.

These scrubbing pads tend to be expensive, making them unsuitable for a disposable or single-use product. Due to the nature of the product use, however, the products can become fouled with dirt, grease, bacteria, and other contaminants after a single use. As a result, consumers must replace these expensive scrubbing pads quite often in order to feel secure in the knowledge that they are using an uncontaminated cleaning pad.

Disposable fabrics with beneficial scrubbing or abrasive attributes for cleaning surfaces are commonly made with techniques involving printing or depositing abrasives made of hot melts or abrasive emulsion resin latex onto the surface of a nonwoven or paper fabric. Application of abrasive additives to a nonwoven fabric normally involves additional manufacturing steps, including steps to apply, cure, harden or solidify the material applied to the surface (such as by heating or cooling). Additionally, deposition of coarser, high denier fibers of cut staple length or continuous filaments on the surface of layered nonwoven substrates is a known technology for producing abrasive surfaces. Such high denier fibers may be 20 to 200 denier or higher versus the 0.5 to 15 denier fiber typically used for short fiber airlaid processes commonly used to make low cost, high performance wipes and disposable absorbent fabrics that are primarily made of woodpulp.

Alternatively, known methods using laminations of nonwoven fabrics to apertured films, or various scrims can provide an abrasive feature. However, these methods involve additional fabric costs and manufacturing steps and the resulting disadvantages. These methods generally produce fabrics with undesirable mechanical strength, and non-uniformity in the machine and cross machine directions, which may require the use of more materials to achieve the necessary minimum mechanical strength and are limited in their ability to produce desirable low-density fabrics with maximum absorbency.

Therefore, there is a need for a simplified direct process capable of producing abrasive and decorative effects in situ, without additional processing steps and associated limitations, using cost efficient low denier fibrous material.

DESCRIPTION OF THE INVENTION

A simplified manufacturing method for directly producing fabrics with a rough, textured or abrasive surface utilizing commonly available materials has been discovered, which exploits short fiber airlaid process equipment and relatively short low-denier fibers. By adding an outer layer or layers (e.g., a top layer and/or a bottom layer) comprising bicomponent synthetic fiber and then activating a component of the bicomponent fiber, the invention provides a unitized composite having an abrasive, rough and/or textured surface exhibiting functional and/or decorative attributes without additional processing steps and with maximum absorbency and uniform mechanical strength in both the machine direction (MD) and cross direction (CD).

According to one aspect of the invention, deposition of selected low denier synthetic fibers having a melting point lower than those used in the interior regions of the assembly on one or more surface layers of a nonwoven fabric, followed by activation, will impart a rough/abrasive surface to that fabric, when the fabric is heated hot enough to cause the surface layer's synthetic fibers to contract, partially melt, or fully melt.

According to another aspect of the invention, the synthetic fibers on one or more surfaces can be diluted with other fibers to create a modified abrasive or decorative effect, without departing from the spirit of the invention.

According to another aspect of the invention, a fabric with these rough or abrasive functional characteristics can be used for a wide variety of hard surface cleaning applications, such as floor mop applications, wipe applications, glass cleaning pad applications, plastic (including spa or pool) cleaning pad applications, or other surface cleaning pad applications, such as tile cleaning pads or ceramic cleaning pads.

According to another aspect of the invention, a fabric with these functional characteristic can be used in skin care applications.

According to another aspect of the invention, a fabric with a textured, spider-web-like surface on one side, and with a more solid surface on the other side, can be used for visually appealing decorative applications, such as, for example, window cover applications, lamp shades, table cover applications, or for other artistic applications requiring novel texturing.

According to another aspect of the invention, a fabric with a visually appealing spider-web-like surface on one side can be used for insulative decorative tiles and wall coverings, for example, ceiling tiles and cubicle walls.

According to another aspect of the invention, fabrics of this type can be produced on short fiber airlaid machines, or in combination with other machines capable of making similar fabrics, such as a carding machines, wet forming machines, spunbond and spunmelt nonwoven processes.

According to another aspect of the invention, a fiber assembly with these synthetic layer(s) may be optionally shaped into a wave-like fabric prior to activating.

According to another aspect of the invention, a wave-like fabric with these rough, textured or abrasive synthetic top and bottom layers may have different surface texture characteristics and scrubbiness on the top surface compared to the bottom surface.

According to another aspect of the invention, the rough synthetic fiber layer(s) may utilize white, uncolored, or colored fibers.

According to another aspect of the invention, an un-activated fiber assembly utilizing these synthetic layer(s), in particular with a layer on a surface, may be wetted via spraying or other methods, with a dye solution or other colorant prior to activation to impart deeper shades of color to the surface fibers after activation produces partial or full melting.

According to another aspect of the invention, a fiber assembly utilizing these synthetic layer(s), in particular with a layer on a surface, may be optionally wetted via spraying or other methods, with other functional chemistries, to treat the rough or abrasive surface.

According to another aspect of the invention, a fabric made with an abrasive or rough synthetic surface will have improved glide characteristics (i.e. reduced resistance to moving on a flat surface) compared to equivalent flat fabric assemblies while providing an enhanced cleaning effect.

DETAILED DESCRIPTION OF ILLUSTRATIVE EMBODIMENTS

Figure 1:
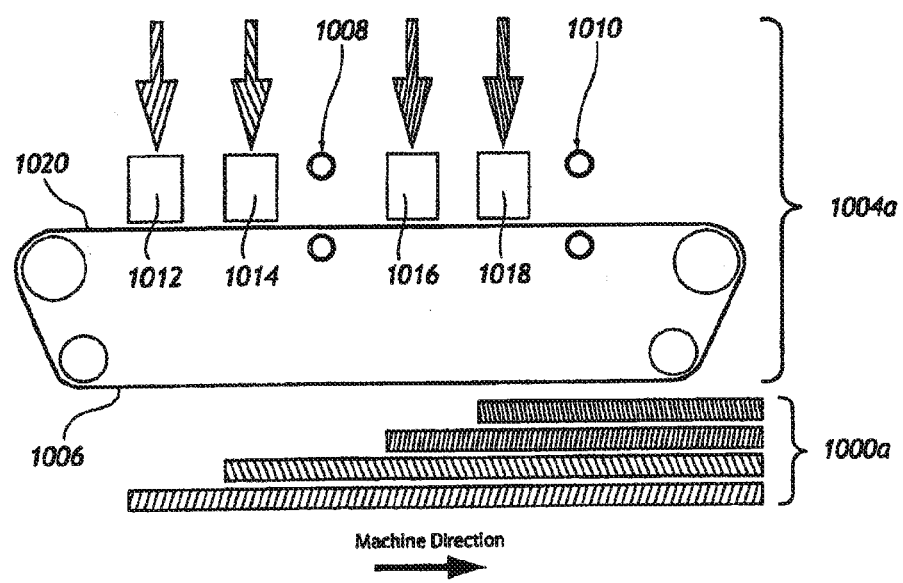
FIG. 1 shows an exemplary short fiber airlaid machine with four forming heads and an exemplary airlaid assembly of loose fiber layers which are optionally compressed.

Various embodiments of the invention address problems encountered with known scrubbing pads by providing a method of manufacturing low-cost disposable cleaning fabrics and disposable scrubbing pads which can exhibit a wide range in level of abrasiveness, may be thin, comfortable and easy to hold, may have a good absorbency, and may provide benefits not previously supplied in abrasive cleaning articles of the past.

Certain scrubbing products of the present invention may be useful in many different hard surface cleaning applications. For instance, a scrubbing pad having an abrasive layer and an absorbent layer may be configured for use as a dishcloth, a scouring pad, a sponge, a polishing pad, a sanding pad, or a personal cleansing pad, such as an exfoliating pad. In addition, the scrubbing product can be part of a cleaning tool (such as a mop, etc.) useful for cleaning floors, walls, windows, toilets, and the like. In certain embodiments, the product of the present invention may include the abrasive layer alone, without any absorbent layer. For example, an abrasive layer alone may be utilized as a scouring cloth, a polishing cloth, a sanding cloth, or a personal cleansing cloth such as an exfoliating cloth.

Although the invention is illustrated and described herein with reference to specific embodiments, the invention is not intended to be limited in the details shown. Rather, various modifications may be made in the details within the scope and range of equivalents of the claims and without departing from the invention. Also, the embodiments selected for illustration in the figures are not shown to scale and are not limited to the proportions shown.

As used herein, the term "nonwoven" means a web having a structure made of individual fibers which are interlaid, but not in an ordered or identifiable manner such as occurs in a woven or knitted web. As defined by INDA, a trade association representing the nonwovens fabrics industry, nonwoven fabrics are generally fabric or web structures bonded together by entangling fibers or filaments (and by perforating films) mechanically, thermally or chemically.

Nonwoven webs are formed from many processes, such as, for example, airlaying, carding, meltblowing, spunbonding, spunmelting (a modified combination of meltblowing and spunbonding), co-forming, wet forming, scrim and netting extrusion, and film perforation. The term "airlaid" means that a nonwoven web is formed by a dry air-laying process, which deposits assemblies of loose fibers on a substrate such as a porous collecting wire.

As used herein, the term "short fiber airlaid process" refers to a particular type of dry air-laying process that is substantially different from carding, spunbonding and meltspinning, and which was originally developed to process relatively short wood pulp fibers for producing low-density disposable fabrics, like high bulk towels, baby wipes, and feminine napkin absorbent media. Typical machines used for such short fiber airlaid processes are supplied by Dan Web A/S, and Newmag Denmark A/S of Denmark, and by EPS of Shanghai, China.

Most short fiber airlaid machines employ emulsion resin bonding techniques, or thermal bonding techniques with relatively short meltable synthetic fibers between 1 and 20 mm in length, or both in combination, using a through air bonding system for activation of the chosen bonding system. Thermal bonding without the use of emulsion resins is a more elegant and energy efficient process than processes involving application of emulsion resins with aqueous components, whether or not the emulsion resins are abrasive. However, the available selection of short cut synthetic thermal bonding fibers in appropriate lengths processable by the short fiber airlaid processes and the associated high costs for those shorter fibers adds to the expense of thermal bonding disposable products. The cut lengths needed are typically from about 1 mm to 20 mm, rather than the longer-length staple synthetics fibers typically used in carded nonwovens. Most short fiber airlaid machines utilize relatively short synthetic fibers ranging in length from about 1 mm to 18 mm, most typically 4 mm to 6 mm, and such short fiber airlaid machines are generally not suitable for handling much longer fibers typical for older carding-type processes as commonly used to manufacture nonwoven fabrics, which typically range from about 20 mm to 250 mm in length.

As used herein, the term "element" refers to one individual component of a structure, assembly, composite, or lamination, i.e., a layer, fiber, particle, filler, or any other component that can be incorporated (e.g., fusion bonded, adhesively bonded, physically bonded by entanglement or the like, or occluded within) into a unitized structure, assembly, composite, or lamination.

As used herein, the term "assembly" refers to a deposition of loose fiber elements or a layered combination of two or more elements of a structure.

As used herein, the terms "unitized structure" or "unitized composite" refer interchangeably to the structure resulting from bonding layered assemblies in an oven or other activating device which causes the layers of an assembly to bond together.

As used herein, the terms "bi-component fiber" and "multi-component fiber" refer interchangeably to a fiber having multiple components (i.e., at least two components) such as fibers comprising a core composed of at least one synthetic polymer material that is encased within a sheath composed of one or more different materials (such as another polymer material with a different melting point). Some types of "bicomponent" or "multi-component" fibers can be used as binder fibers that can be bound to one another and to other elements and fibers to form a unitized structure. For example, in a polymeric fiber, the polymer comprising the sheath often melts at a different, typically lower, temperature than the polymer comprising the core. As a result, such binder fibers provide bonding after appropriate activation, such as by heating in an oven and subsequent cooling. This is due to activation of at least one of the components to facilitate bonding at the contact points between elements of the assembly, while retaining the desirable fibrous structure of at least one other component.

Bicomponent synthetic fibers used in nonwovens manufacture are normally used either as bonding fibers, as supportive filler fibers to provide bulk or other characteristics to a fabric, or for both purposes. Normally higher denier fibers are stiffer and courser than lower denier fibers of similar construction and lower denier fibers are used to manufacture softer and more drapable fabrics with smaller capillaries which are generally desirable in hard surface cleaning products. Additionally lower denier bicomponent bonding fibers have more bonding sites in fibrous assemblies because there are more fibers than in an equivalent higher denier fibrous assembly. As used herein, low denier fibers are defined as being between 0.5 and 15 denier and high denier fibers are defined as being above 15 denier.

As used herein, the term "wave-like" is used to describe shaped assemblies characterized by a substantially periodic waveform that is not necessarily sinusoidal, perfectly repeating, easily seen, or perfectly parallel, and that may be further characterized in terms of wavelength and amplitude. The wavelength is the distance between repeating units of a wave pattern (e.g., measured from one crest to the next crest, or from one trough to the next trough) and the amplitude is the height of the undulations. Alternatively, rather than characterizing the waveform in terms of wavelength, it may be characterized in terms of wavenumber, which is inversely related to wavelength and refers to the number of repeating units of a wave pattern per unit length. The wavenumber is the spacial analogue of frequency. The wave-like form need not be wave-like on both the top and bottom in the finished composite, nor perfectly recurring, i.e., there may be some change in size, shape, or other variation of the generally recurring waveforms. Such wave-like form where one side of the unitized composite is relatively flat after activation is depicted generally in an idealized form by 2100 in FIG. 5. Suitable shaping technologies for making assemblies having a wave-like structure are disclosed in U.S. patent application Ser. No. 11/811,965 entitled "WAVE-LIKE STRUCTURES BONDED TO FLAT SURFACES IN UNITIZED COMPOSITES AND METHODS FOR MAKING SAME," filed Jun. 13, 2007, the entire disclosure of which is incorporated herein by reference.

As used herein, the term "activation" may be any process, whether with a heated oven, by radiation of infrared or other electromagnetic energy, or by some other method, which causes bonding to occur between elements within one layer and/or causes bonding to occur between elements in two or more layers when cooled or otherwise removed from activation. Additionally this "activation" refers to the process for melting or otherwise developing the rough or abrasive attribute as described below.

As used herein, the term "recipe" refers to a specific formula of a mixture of various elements used in an assembly, including the type and amount of each component of an assembly.

Exemplary embodiments of the invention will be described with reference to the drawings.

FIG. 1 shows a schematic representation provided as an exemplary system that can be used to form a unitized short fiber airlaid composite according to aspects of this invention. Exemplary short fiber airlaid process machinery suitable for the practice of the present invention is available for public use at Marketing Technology Service, Inc. of Kalamazoo Mich. USA, or through Dan Web A/S of Aarhus, Denmark and Neumag Denmark A/S of Horstens, Denmark.

FIG. 1 is a schematic side view of an exemplary web and complimentary web forming systems illustrating how individual fiber layers are deposited on top of each other while moving through respective web-forming systems. The layers of the exemplary webs are not depicted to any particular proportion or scale, but are instead shown schematically for purposes of illustration only. Also, because of some mixing and blending of fibers between the layers of an airlaid structure that occurs during the web-forming process, the layers are not perfectly distinct as depicted in the figures.

Generally, the web forming system illustrated in FIG. 1 includes a short fiber airlaid machine having a conveyor surface 1020 which may be a porous wire screen on which the web of the airlaid composite is formed. Fiber-introducing heads 1012, 1014, 1016 and 1018 are positioned above the wire screen 1020 in order to deliver the components of the airlaid composite to the screen in a controlled manner. The fiber-introducing heads are configured to introduce the same or different fibers in any combination, as depicted by cross-hatching. For example, two or more (or all) of the heads can introduce the same fibers or fiber mixture, or all or some of the heads can introduce different fibers or fiber mixtures. Rolls 1008 and 1010 are also provided in order to selectively modify the web as it passes through the forming system. The schematic representation of the resulting web of the unitized airlaid composite 1000a (juxtaposed below the machine in FIG. 1) includes the web portions provided by each of the heads as those portions build to form the web of the unitized airlaid composite along the machine direction (MD). The web portions are integrated in actual airlaid systems as opposed to the distinct zones depicted for purposes of illustration.

Referring to FIG. 1, an exemplary system utilizes a machine 1004a to form a web of an airlaid composite 1000a.

The machine 1004a includes a conveyor mechanism 1006 that supports a wire screen 1020 on which the components of the airlaid composites are deposited. A pair of upstream rolls 1008 and another pair of downstream rolls 1010 are provided in such a way that the wire screen 1020 passes between each pair of rolls 1008 and 1010. Multiple fiber deposition heads 1012, 1014, 1016 and 1018 are provided above the wire screen 1020 along the length of the machine 1004a. Illustrated machine 1004a includes four (4) heads, including a first head 1012, a second head 1014, a third head 1016, and a fourth head 1018. First and second heads 1012 and 1014 are positioned upstream from the upstream rolls 1008, and third and fourth heads 1016 and 1018 are positioned downstream from the upstream rolls 1008, and upstream from downstream rolls 1010. The upstream and downstream sets of rolls 1008 and 1010 are optionally utilized as compression rolls. The gap between the rolls 1008 and the gap between the rolls in 1010 is adjustable.

Further, skilled practitioners will appreciate that heated compression rolls will produced different results compared to unheated compression rolls, and that variations in the pressure employed in combination with the compression roll temperature will affect results in the following steps, such as shaping the assembly into wave-like shaping, and will also affect final fabric physical attributes. The machine 1004a illustrated in FIG. 1 is shown to have heads 1012, 1014, 1016, and 1018 feeding substantially equal amounts of the same fiber composition. Alternatively, one or more of heads 1012, 1014, 1016, and 1018 optionally feed substantially different amounts of fibers or feed substantially different fibers or fiber compositions. As illustrated in FIG. 1, the machine 1004a does not utilize upstream and downstream rolls 1008 and 1010 as compression rolls (i.e., the gaps between the compression rolls of 1008 and of 1010 are maintained so as to eliminate or minimize compression of the web passing between them). Accordingly, the machine 1004a is configured to yield a relatively thick fabric having a relatively low density. Skilled practitioners will utilize the compression rolls to achieve desired fabric attributes.

Figure 2:
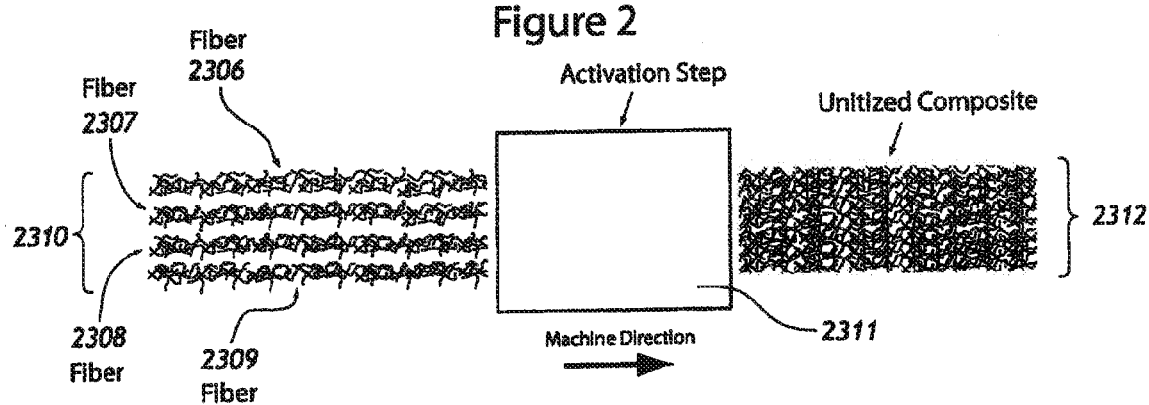
FIG. 2 shows an assembly of loose fiber layers which are then bonded in an activation step into a unitized composite.

FIG. 2 shows an exemplary assembly of loose fiber layers 2310 assembled on top of each other and then bonded together into a single unitized composite 2312 in an oven or other activation step 2311.

Figure 3:
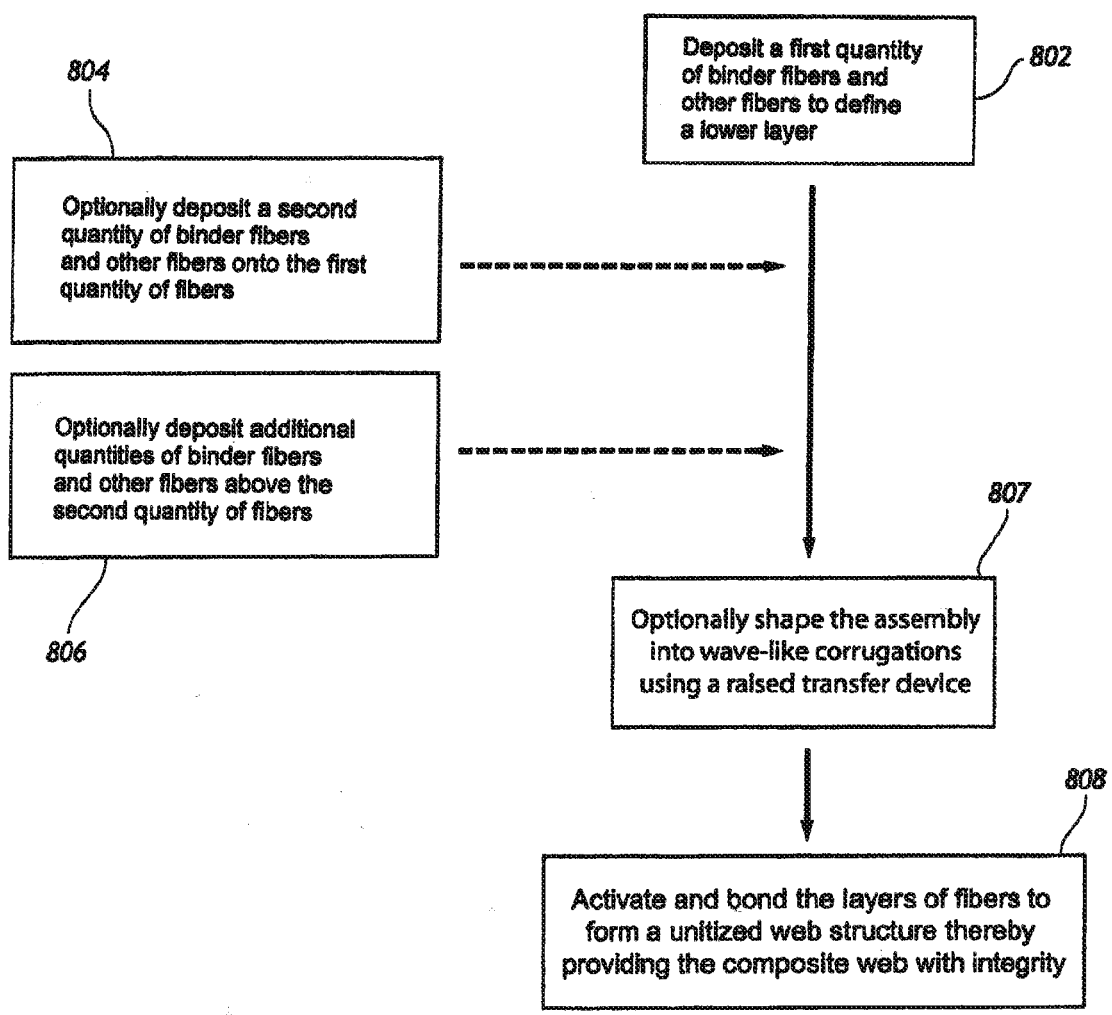
FIG. 3 shows a flow chart of a process for forming unitized composites according to aspects of this invention.

FIG. 3 is a flow chart of exemplary steps for fabricating a unitized airlaid composite in accordance with one embodiment of the present invention. Block 802 illustrates the step of depositing a first concentration of fibers so as to define a layer. Block 804 illustrates the step of depositing a second concentration of fibers onto the first concentration of fibers, wherein the second concentration of fibers is layered on top of the first concentration of fibers to form contacting unbonded, but relatively discrete layers. Block 806 illustrates the step of depositing an additional concentration(s) of fibers to further construct multiple layers. Block 807 illustrates the additional optional step of shaping the layer assembly into a wave-like form. Block 808 illustrates the final step of activating and bonding the assemblies of fibers together to form a unitized composite structure.

Practitioners skilled in the art will recognize that the recipes of fiber blends, mass of materials deposited in each layer of an assembly, and the densities of individual layers deposited will affect the behavior of the individual layers during and following activation. Combinations with other potentially desirable materials—such as paper, textile or nonwoven webs, films or similar extruded or roll good systems (including direct process elements made simultaneously during the manufacture of airlaid assemblies)—can be made without departing from the spirit of the inventions. Indeed, such variations are contemplated as being desirable to take advantage of beneficial economies and processing advantages from commercially available roll goods or other assembly methods that offer properties of technical or economic interest.

Figure 4:
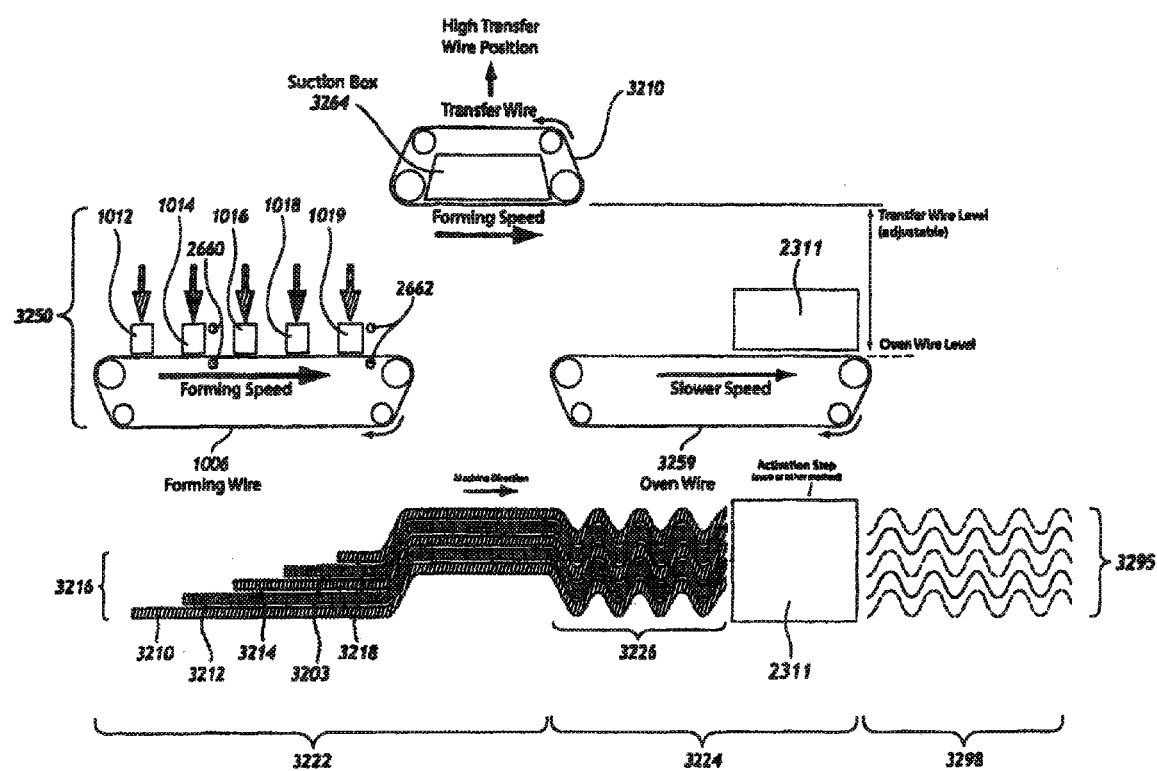
FIG. 4 shows a method of forming a unitized composite on a short fiber airlaid machine by using loose short fiber assemblies which are shaped into a wave-like form using a transfer wire raised in the z-direction relative to the oven wire and with the oven wire moving at a lower speed to impart wave-like shaping.

FIG. 4 illustrates practice of one method for shaping a short fiber airlaid layered assembly into a wave-like shaping prior to the activation step, using a raised transfer wire device such as is offered for sale by Dan Web A/S of Aarhus, Denmark. The transfer device functions by employing a suction box 3264 to provide vacuum through a moving porous wire belt 3210 closely synchronized in speed to both the oven wire 3259 and the forming wire 1006. The function of the transfer wire in normal operation is to lift the fragile loose fiber assembly from the forming section wire and then deposit the assembly—intact—onto the oven wire where subsequent activation and bonding will occur.

Figure 5:
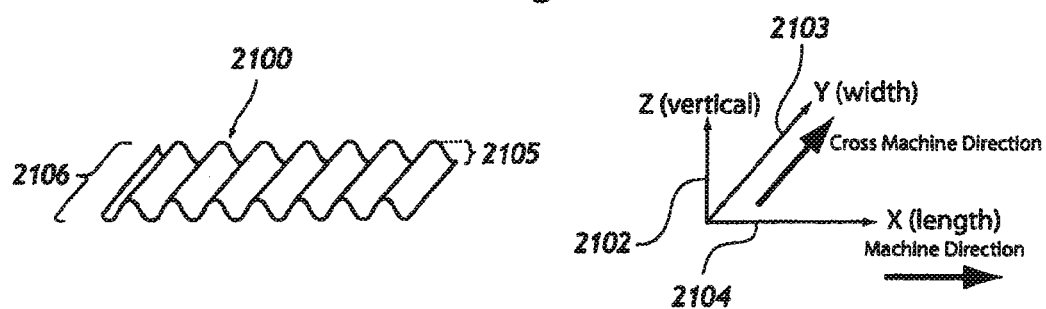
FIG. 5 shows a wave-like structure and the x, y, and z, machine and cross-machine directional conventions used herein.

FIG. 5 shows a three-dimensional view of a wave-like element 2100. Such a structure is thicker and lower in overall density relative to a flat assembly of similar formulation. FIG. 5 also provides a reference to demonstrate the x, y, and z direction conventions that are referred to herein, showing the length 2104 (x or machine direction), width 2103 (y or cross machine direction) and vertical height 2102 (z direction) of a continuous assembly.

Table 1 lists the recipe for layered composition of an exemplary assembly with multiple layers that is useful in an abrasive floor mop or hard surface wiping fabric when activated in a through air oven at about 160 degrees C., using 6 mm length synthetic fiber and southern kraft pine woodpulp.

TABLE 1

| | |
|---|---|
| 5$^{th}$ layer (top surface): | 40 grams per square meter (gsm) Trevira Type 255 1.5 denier |
| 4$^{th}$ layer: | 18 gsm Trevira Type 255 1.5 denier with 72 gsm wood pulp |
| 3$^{rd}$ layer: | 18 gsm Trevira Type 255 1.5 denier with 72 gsm wood pulp |
| 2$^{nd}$ layer: | 18 gsm Trevira Type 255 1.5 denier with 72 gsm wood pulp |
| 1$^{st}$ layer (bottom surface): | 40 gsm Fibervision AL-Delta II 3 denier |

In this example, the bottom layer (to be contacted against the floor surface) is a layer of FiberVisions' 6 mm length 3.3 dtex AL-Delta II fiber. The Fibervisions AL-Delta II fiber is a typical bonding fiber used in short fiber airlaid processes manufactured by Fibervisions NS of Varde, Denmark, which has a core of polypropylene which melts at about 160 degrees C. and a sheath of polyethylene which melts at about 135 degrees C., This is an example of a fiber that can be utilized to achieve a rough or abrasive effect on the fabric surface. A bi-component bonding fiber normally utilized as a minority component for thermal bonding at temperatures below 160 degree C. (typically about 140 degrees C.) in an airlaid fabric, the AL-Delta II fiber exhibits the abrasive effect when used as a majority component of a surface layer, when the assembly is heated near, at, or above the melting temperature of the core polymer of the AL-Delta II fiber which is about 160 degrees C. Dilution of the surface layer fibers in the assembly with other materials, for example other bonding fibers, or other non-bonding synthetic or natural fibers, may be used to control shrinkage, temper the abrasive effect, or provide a secondary abrasive component or other functional attributes, such as absorbency, or fire retardancy.

The inside layer(s) of the recipe include wood pulp mixed with a short airlaid process bonding fiber (Trevira type 255, 1.5 denier, 6 mm in length bicomponent bonding fiber, manufactured by Trevira GmbH of Bobingen, Germany). This fiber has a core made of polyester, which normally melts at about 255 degrees C., and a sheath made of polyethylene, which normally melts at about 135 degrees C.

A wide variety of other short fibers in the range of about 1 to 20 mm in length can be used to accomplish the present invention on conventional short fiber airlaid equipment besides those cited in the exemplary recipes as long as the core polymers of the bicomponent fibers used to bond the interior layers of the assembly are higher in melting point than the core polymer of the bicomponent fibers used in the surface layer(s), which are deliberately heated to about the melting point temperature of the core polymer to produce at least some flow and contraction of the fiber into melted, irregular droplets or partially discrete semi-melted fibers.

Suitable bicomponent fibers for the invention preferably contain at least two component polymers that have different melting points. The component polymers occupy distinct cross sections along substantially the entire length of the fibers, and the cross section that contains the lowest melting component polymer occupies at least some portion, desirably at least half, of the peripheral surface of the fibers. Suitable fibers may have a side-by-side configuration or sheath-core configuration, e.g., eccentric configuration or concentric configuration.

The bicomponent fibers are typically selected to have a melting point difference between the highest melting component polymer and the lowest melting component polymer of at least about 5° C., more desirably at least about 10° C., most desirably at least about 30° C., such that the lowest melting component polymer can be melted or otherwise rendered adhesive without melting the higher melting component polymers of the bicomponent fibers, thereby the difference in the melting points can be advantageously used to bond nonwoven webs containing the bicomponent fibers. When a nonwoven web containing the bicomponent fibers is heated to a temperature equal to or higher than the melting point of the lowest melting component polymer but below the melting point of the highest melting component polymer, the melted portions of the fibers form autogenous interfiber bonds, especially at the crossover contact points, throughout the web while the high melting polymer portions of the fibers maintain the physical and dimensional integrity of the web.

As indicated above, the deposited fibrous assembly is activated by heating the fiber web to melt or render adhesive the lowest melting component polymer of the conjugate fibers and, thus, allowing the fibers to form interfiber bonds, especially at cross over contact points of the fibers. Bonding processes suitable for the present invention include through-air-bonding processes, oven bonding processes, infrared bonding processes and other radiation methods. Of these, particularly suitable are through-air-bonding processes that direct an adjustable penetrating flow of heated air through the porous assembly of fibrous elements to quickly and evenly raise the temperature of the web. In addition, through-air-bonding processes can be modified to impart an optional fiber density gradient in the assembly during the bonding process. When a high flow rate of heated air is directed onto the nonwoven web during the bonding process, the compacting pressure of the air flow and the weight of the fibers create an increasing fiber density gradient in the direction of the air flow, forming a bonded nonwoven web having a fiber density gradient. A nonwoven web having an increasing fiber density gradient in the direction of its thickness provides two distinct surfaces having different textural and physical properties, a low fiber density surface and a high fiber density surface. In general, the low fiber density surface of such bonded nonwoven webs may be designed so that it provides a soft surface that is especially suited for applying impregnated active agents, like cleaning fluids, while the high fiber density surface provides a somewhat more rigid, smoother surface which optionally can conform to the surface pattern of the oven conveyor wire.

Short fibers suitable for the present invention can be produced from a variety of thermoplastic polymers that are known to form fibers. Suitable polymers for the present invention are selected from polyolefins, polyamides, polyesters, copolymers containing acrylic monomers, and blends and copolymers thereof. Suitable polyolefins include polyethylene, e.g., linear low density polyethylene, high density polyethylene, low density polyethylene and medium density polyethylene; polypropylene, e.g., isotactic polypropylene, syndiotactic polypropylene, blends thereof and blends of isotactic polypropylene and atactic polypropylene; and polybutylene; as well as blends and copolymers thereof. Suitable polyamides include nylon 6, nylon 6/6, nylon 10, nylon 4/6, nylon 10/10, nylon 12, nylon 6/12, nylon 12/12, and hydrophilic polyamide copolymers such as copolymers of caprolactam and an alkylene oxide, e.g., ethylene oxide, and copolymers of hexamethylene adipamide and an alkylene oxide, as well as blends and copolymers thereof. Suitable polyesters include polyethylene terephthalate, polybutylene terephthalate, polycyclohexylenedimethylene terephthalate, and blends and copolymers thereof. Acrylic copolymers suitable for the present invention include ethylene acrylic acid, ethylene methacrylic acid, ethylene methylacrylate, ethylene ethylacrylate, ethylene butylacrylate and blends thereof. Particularly suitable polymers for the present invention are polyolefins, including polyethylene, e.g., linear low density polyethylene, low density polyethylene, medium density polyethylene, high density polyethylene and blends thereof; polypropylene; polybutylene; and copolymers as well as blends thereof. Of the suitable polymers, particularly suitable polymers for the high melting component of conjugate fibers include polypropylene, copolymers of polypropylene and ethylene and blends thereof, more particularly polypropylene; and particularly suitable polymers for the low melting component include polyethylenes, more particularly linear low density polyethylene, high density polyethylene and blends thereof. In addition, the polymer components may contain additives or thermoplastic elastomers for enhancing the crimpability and/or lowering the bonding temperature of the fibers, and enhancing the abrasion resistance, strength and softness of the resulting web.

In accordance with the present invention, bicomponent fibers, are particularly useful for the invention, and suitable bicomponent fibers have from about 10% to about 90%, desirably from about 20% to about 80% to about 20%, more desirably about 60% to about 40%, by weight of a high melting polymer.

The unitized composites produced by the present invention are highly suitable for polishing and buffing applications. In addition, the unitized composite pad, which has a porous, lofty structure and yet exhibits high resilience, strength and abrasion resistance, is adapted for impregnating a large amount of active cleaning or other agent and for evenly and selectively applying the impregnated active agents. The pad is also semi-abrasive and gentle enough for polishing typical solid target surfaces without damage.

The assemblies may be optionally shaped prior to activation by waving technology, providing folds where dirt materials can be trapped, and also increasing the net pressure (by reducing the contacting surface area) achieved by local areas of the floor-contacting surface. Wave numbers between 1 and 30 per inch are preferred although higher wavenumbers are also suitable. The technologies described in U.S. application Ser. No. 11/811,965 (incorporated herein) may be employed for wave-like shaping of the assemblies.

The floor-contacting surface of a floor mop product or wiping product, whether shaped by waving technology, or as a relatively flat surface, can be further modified by selection of activation step parameters, such as in the case of an oven activation step, where the weave pattern of the bottom oven wire, air pressure applied to the airlaid fabric against the oven wire (in a through air oven), and compression during activation by an optional top wire pressure (or top patterned roll or smooth roll pressure) applied while the fabric is still hot, to provide the additional shaping or different texturing to both the top and bottom layers of the fabric.

Table 2 lists an exemplary recipe for a layered composition with two rough layers that is useful as a cleaning pad or wipe using 6 mm length synthetic fibers.

TABLE 2

| | |
|---|---|
| 4th layer (top surface): | 40 gsm Fibervision AL-Delta II 3 denier |
| 3rd layer: | 30 gsm Trevira Type 255 1.5 denier |
| 2nd layer: | 150 gsm Wellman Fortrel 6 denier polyester with 150 gsm Trevira Type 255 1.5 denier |
| 1st layer (bottom surface): | 50 gsm Fibervision AL-Delta II 3 denier |

The fabric can be made with one or both surfaces having the rough/abrasive texture by use of a fiber providing the discovered characteristics, such as the AL-Delta II fiber. Again, the surface layer can be diluted to provide control over the rough or abrasive attributes as required, with other functional or filler fibers or materials, without departing from the spirit of the invention. For example, the AL-Delta II fibers may be diluted with polyester or polyethylene fibers to temper the abrasive function of the fabric for applications that are more sensitive to scratching or abrasive feel.

Table 3 lists the layered composition of an exemplary unitized composite with multiple layers that is useful as a decorative fabric, such as for use in a lamp shade.

TABLE 3

| | |
|---|---|
| 2nd layer (top surface): | 60 gsm Fibervision AL-Delta II 3 denier |
| 1st layer (bottom surface): | 30 gsm Trevira Type 255 1.5 denier |

The bottom layer consists of the Trevira bonding fiber, with a layer of the AL-Delta II fiber on the second layer. In this case the Trevira layer remains a solid background layer, and is somewhat translucent, with the AL-Delta II layer forming a spider-web-like layer, that has a differential translucent property. Colored fibers with similar attributes to the AL-Delta II fibers could provide additional decorative attributes with this, and with other uses.

One sided treatment with the rough/abrasive fiber layer is suitable for other uses, including artistic and decorative purposes, and for example table covering purposes.

Table 4 lists the layered composition recipe of an exemplary fabric with multiple layers that is useful for producing textured unitized composites for use in wall and surface covering and as a ceiling tile.

TABLE 4

| | |
|---|---|
| Top surface: | 50 gsm Fibervision AL-Delta II 3 denier |
| 2nd layer from top: | 40 gsm Trevira Type 255 1.5 denier |
| additional layers: | 20% Trevira Type 255 1.5 denier 80% insulative material, for example recycled newsprint |

The abrasive/rough side, which can be either the top or bottom layer as manufactured, is adjacent to a layer with all bonding fiber to give the surface strength and a visually appealing texturing. The balance of the recipe of an example ceiling tile consists of functional insulative materials, which may include, but are not limited to, fiberglass, rock wool, recycled synthetic and cellulosic fibers, etc. The decorative rough surface may optionally utilize colored fibers, white fibers, or clear fibers.

Figure 6:
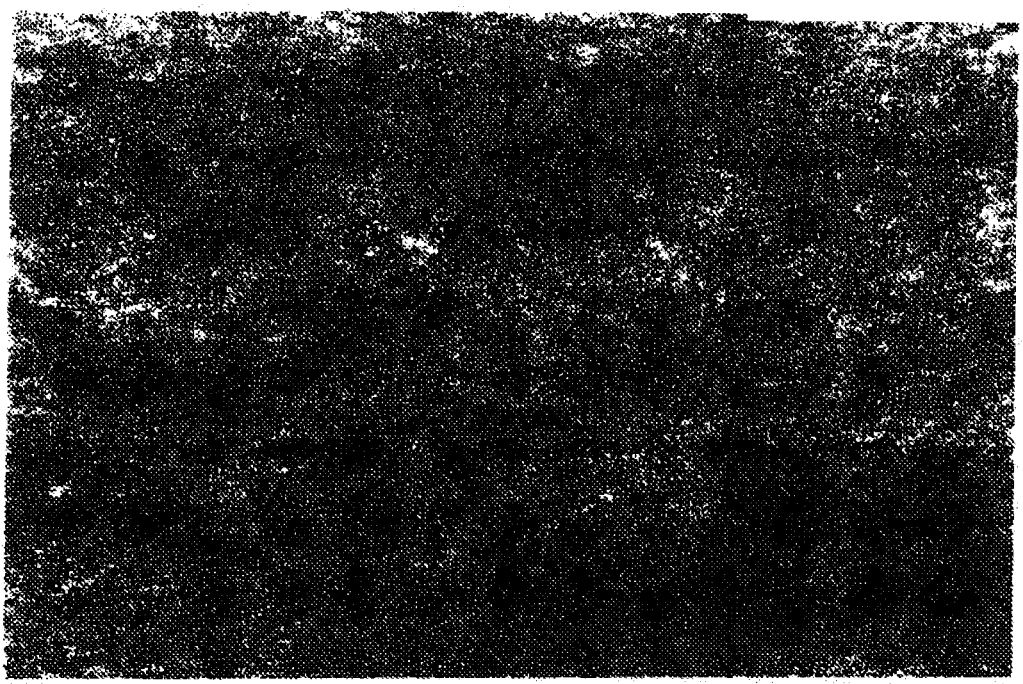
FIG. 6 is an optical micrograph of a fabric showing the melted fibers on the surface layer which provide a rough and decorative effect.

FIG. 6 is an optical micrograph of a fabric showing the melted fibers on the surface providing a decorative or rough effect. The decorative rough or textured effect is determined also by the basis weight of the rough/abrasive layer deposited, the denier of the fibers selected, the temperature and dwell time in the oven, and other factors, including composition of the adjacent layer.

Figure 7:
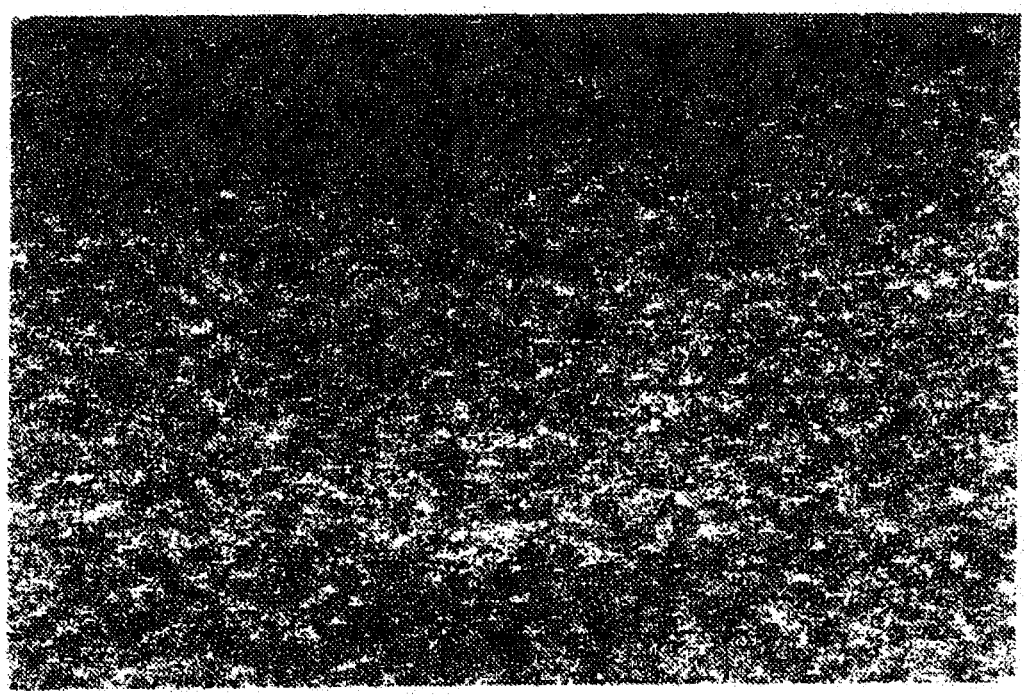
FIG. 7 is an optical micrograph of a fabric showing the melted fibers shaped on the bottom surface by an oven wire.

FIG. 7 is an optical micrograph of a fabric showing the melted fibers shaped on the bottom surface by an oven wire. Characteristics of the activation step (in this case the oven) can allow tuning of the final scrubbiness and/or decorative attributes of the unitized composite.

Figure 8:
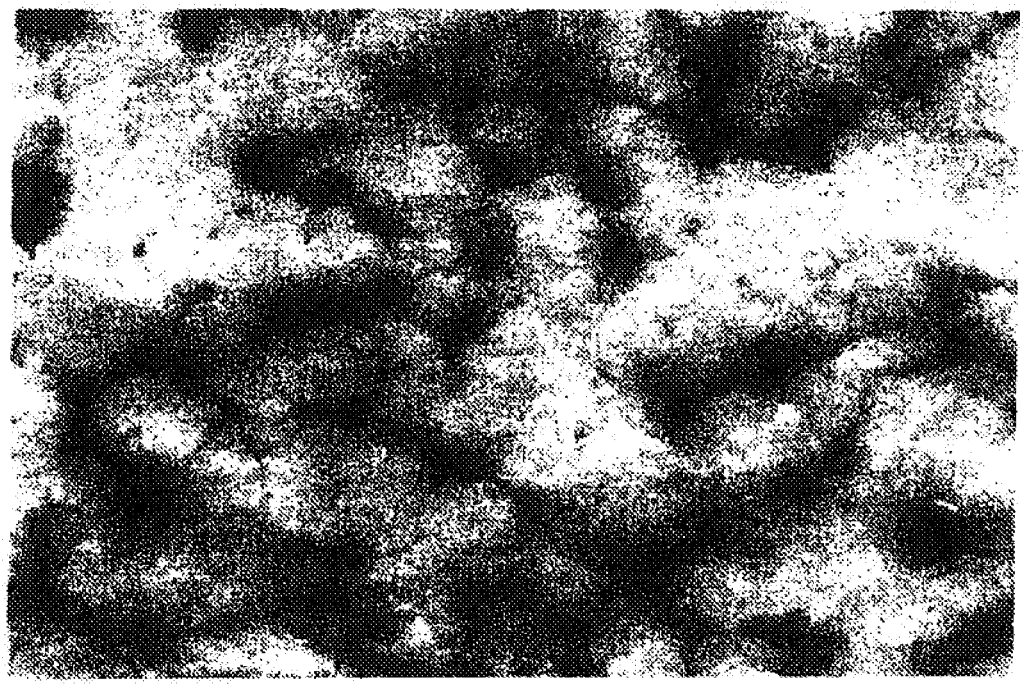
FIG. 8 is an optical micrograph of a fabric where the fibers were sprayed with a dye solution prior to entry into the oven for activation.

FIG. 8 is an optical micrograph of a fabric colored on the top surface by a dye solution sprayed onto the rough fiber layer prior to entering the oven and being melted or partially melted. In this case the AL-Delta II fibers retained all the color and concentrate it when melted, providing a visually appealing effect, as the fibers contracted.

Figure 9:
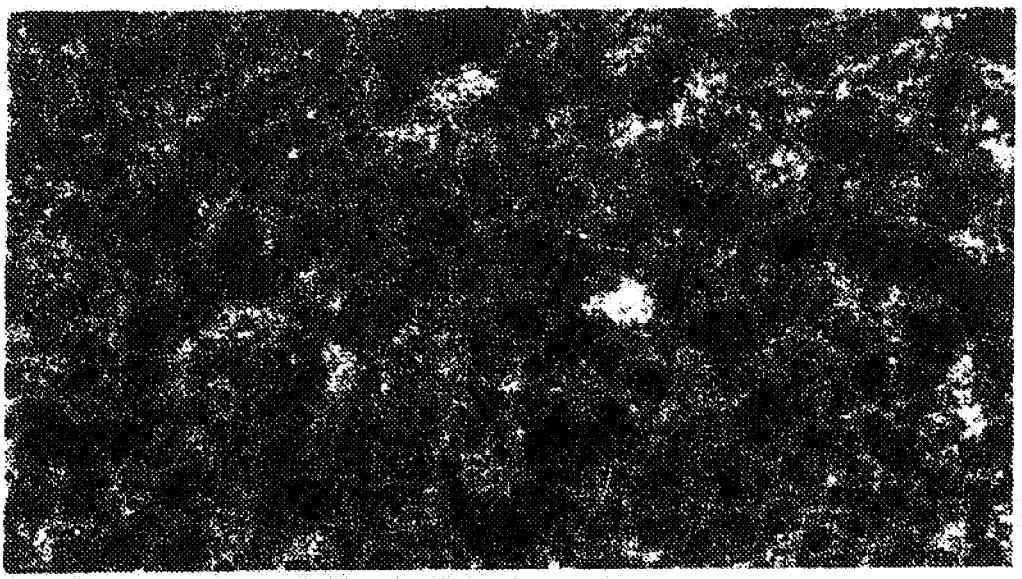
FIG. 9 is an optical micrograph of a single layer doily-like fabric with the synthetic fibers substantially melted.

FIG. 9 is an optical micrograph of a single layer fabric containing only the AL-Delta II fibers. The fabric has contracted into a spider-web-like structure, resulting in a visually appealing fabric with high strength.

Figure 10:
FIG. 10 is an optical micrograph showing an exemplary unitized composite with wave-like shaping.

FIG. 10 is an optical micrograph of an exemplary rough fabric of unitized composition with wave shaping. This shaping provides visually appealing attributes, as well as functional improvements in areas such as mopping and cleaning where the wave-like shaping helps to retain dirt and other particles when wiped across a flat surface.

The described and illustrated embodiments are exemplary of the invention, and do not constitute limitations of the invention. The selection of various alternative materials and/or operating parameters will occur to those skilled in the art and do not constitute a departure from the spirit and scope of the present invention.

The uses and benefits conferred by this invention are also applicable in many fields including, but not limited to finished products for household consumer applications, decorative panel or insulative applications, decorative applications such as window coverings, or for products requiring improved glide characteristics on hard surfaces.

The embodiments shown in the drawings and described above are merely for illustrative purposes and not intended to limit the scope of the invention, which is defined by the following claims as interpreted according to the principles of patent law, including the doctrine of equivalents.

The invention claimed is:

1. A short fiber airlaid process technique for producing a unitized short fiber airlaid composite material with at least one abrasive surface;
    depositing an assembly having at least one outer layer containing a first multicomponent synthetic fiber and at least one inner layer containing a second multicomponent synthetic fiber, wherein each of the components of the first multicomponent synthetic fiber have a melting temperature less than the melting temperature of at least one of the components of the second multicomponent synthetic fiber;

heating the assembly to a temperature at which at least one component of the second multicomponent synthetic fiber melts and at least one component of the second multicomponent synthetic fiber does not melt to effect bonding of fibers at points of contact between fibers, and at which all components of the first multicomponent synthetic fiber flow, contract or at least partially melt to form melted irregular droplets or semi-melted fibers; and cooling the assembly and solidifying the melted irregular droplets or semi-melted fibers, thereby imparting an abrasive quality to an outer surface.

2. The process of claim 1, where the first and second multicomponent synthetic fibers are from between 1 mm to 20 mm in length and are from 0.5 to 15 denier.

3. The process of claim 1, where the outer layer further comprises at least one mono-component synthetic fiber having a length from between 1 mm to 20 mm and from 0.5 to 15 denier.

4. The process of claim 1, where the outer layer having an abrasive surface covers other functional absorbent layers.

5. The process of claim 1, wherein the assembly further comprises at least one other type of fiber to modify roughness of the outer surface.

6. The process of claim 1, where the surface is shaped to have wavelike undulations prior to heating with a wave number from 1 to 30 waves per inch.

7. The process of claim 1, where the fiber assembly is dyed or colored prior to heating.

8. A short fiber airlaid process for producing a unitized short fiber airlaid composite with at least one abrasive surface, comprising:

depositing an assembly having at least one outer layer containing a multicomponent synthetic fiber, and at least one inner layer containing a multicomponent synthetic fiber with a component melting point higher than that of the multicomponent synthetic fiber in the outer layer;

heating the assembly to a temperature that causes the multicomponent synthetic fiber in the inner layer to function as a bonding fiber, and causes all components of the multicomponent synthetic fiber in the outer layer to melt or partially melt; and cooling the assembly to impart an abrasive quality to an outer surface.

\* \* \* \* \*

UNITED STATES PATENT AND TRADEMARK OFFICE
CERTIFICATE OF CORRECTION

PATENT NO. : 8,440,123 B2  
APPLICATION NO. : 12/719180  
DATED : May 14, 2013  
INVENTOR(S) : James P. Hanson and Larry L. Pio Page 1 of 1

It is certified that error appears in the above-identified patent and that said Letters Patent is hereby corrected as shown below:

In the Claims

Column 12, line 57, "airlaid process technique for producing" should be
- airlaid process for producing -

Signed and Sealed this
Second Day of July, 2013

Teresa Stanek Rea
*Acting Director of the United States Patent and Trademark Office*